Sept. 5, 1967  J. E. NEVINS, JR  3,340,424
MICROWAVE PHASE DETECTOR UTILIZING ELECTRON BEAM-CAVITY DEVICE
Filed Oct. 28, 1963  2 Sheets-Sheet 1

INVENTOR.
JOHN E. NEVINS Jr.
BY
Wale Koontz
George Fine
ATTORNEYS

United States Patent Office 3,340,424
Patented Sept. 5, 1967

3,340,424
MICROWAVE PHASE DETECTOR UTILIZING ELECTRON BEAM-CAVITY DEVICE
John E. Nevins, Jr., North Hollywood, Calif., assignor to the United States of America as represented by the Secretary of the Air Force
Filed Oct. 28, 1963, Ser. No. 319,623
6 Claims. (Cl. 315—5.39)

ABSTRACT OF THE DISCLOSURE

A microwave phase detector electron device having an electron beam interacting with three cavities, the first cavity receiving an input microwave signal whose variations in phase are to be detected, the second cavity receiving a phase reference signal, and the third cavity providing an output signal which is representative of the difference in phase between the input microwave signal and the reference signal.

---

The present invention relates to a phase detector and, more particularly, to a microwave phase detector consisting of a single electron discharge device having a pair of input signals and one output signal in which the output signal is representative of the difference in phase of aforesaid pair of input signals.

In the prior art, phase detection was accomplished by including a combination of passive and active devices. Phase detection is normally accomplished at low frequencies where ordinary vacuum tubes are useable. For example, phase detectors generally require balanced voltages for suitable operation, thereby necessitating in general the use of transformers for applying alternating energy to the detectors. At microwave frequencies, however, it is difficult to obtain properly balanced voltages from a transformer since minor structural imperfections therein tend to cause significant unbalance in voltages derived therefrom. Still further, where the ordinary vacuum tubes are incorporated in a microwave detector circuit, additional problems result because of the transit time limitations.

The present invention overcomes limitations in prior microwave phase detectors so that there is provided an active device operating in the microwave frequency region to produce a resultant signal representative of the phase difference between two input signals.

The present invention consists of an electron beam which interacts with three cavities, so as to cause velocity modulation of the electron beam. The first cavity velocity modulates the electron beam proportionally to a microwave input signal. A reference signal is fed into the second cavity which also velocity modulates the beam. The phase between the reference signal to the second cavity and the input signal to the first cavity will determine the resultant velocity modulation of the beam. The beam then interacts with the third cavity. The power delivered to the third cavity is proportional to the velocity modulation which is a function of the phase between the input and reference signal. Thus the output signal of the third cavity is proportional to the phase difference.

An object of the present invention is to provide a microwave phase detector.

Another object of the present invention is to provide a microwave phase detector which is exclusively an active device.

Still another object of the present invention is to provide a microwave detector consisting of an electron beam and three microwave cavities wherein the electron beam interacts with the three cavities so as to cause velocity modulation of the electrons.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
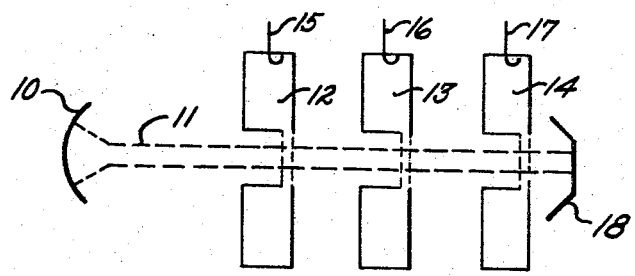
FIG. 1 shows a simplified schematic drawing of the preferred embodiment of the present invention.
Figure 3:
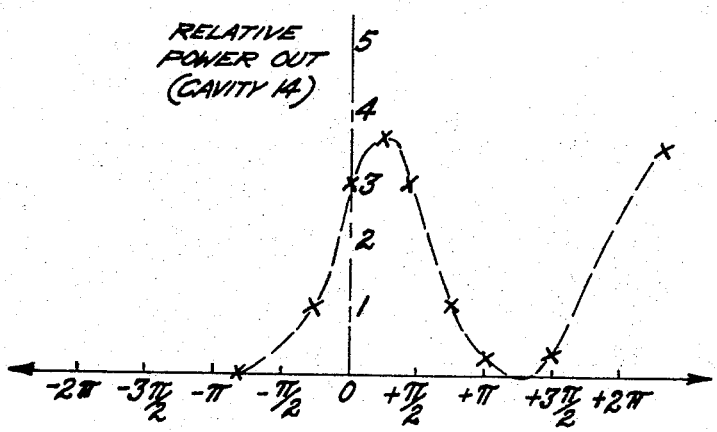
FIG. 3 shows a curve that is representative of the output signal from the preferred embodiment of the present invention.

Now referring to FIG. 1, there is shown a device in a highly simplified form to detect the phase between two microwave signals at the same frequency. The device consists of three microwave cavities 12, 13 and 14 and electron beam 11. There is provided electron gun 10 and collector 18 and electron beam 11 flows there-between. Electron beam 11 interacts with cavities 15, 16 and 17 respectively, so as to cause velocity modulation of the electrons. Cavity 15 receives a microwave input signal by way of input coaxial cable 15 and is resonated thereby. Cavity 15 velocity modulates electron beam 11 proportionally to the microwave input signal. A microwave reference signal of the same frequency as the microwave input signal is fed into cavity 13 by way of coaxial input cable 16 and cavity 13 is resonated thereby. Electron beam 11 passes through cavity 13 and is also velocity modulated thereby. The phase between the reference signal to cavity 13 and the input signal to cavity 12 determines the resultant velocity modulation of beam 11. Beam 11 when passing through cavity 14 interacts therewith. The power delivered to cavity 14 is proportional to the velocity modulation which is a function of the phase between the microwave input signal and the reference signal. Thus the output signal, provided by way of output coaxial cable 17, is proportional to the phase difference, as shown in the curve of FIG. 3. The power output from cavity 14 as a function of phase difference is given by the following expression $$\text{Power out} = A\left[ +\frac{\alpha_2 L_2}{\alpha_1 L_1}(\sin\phi + \cos\phi)\right]^2$$

$\phi$ = phase difference between reference and input signal.

Thus the above method and apparatus provides an active device for phase detection at microwave frequencies.

Figure 2:
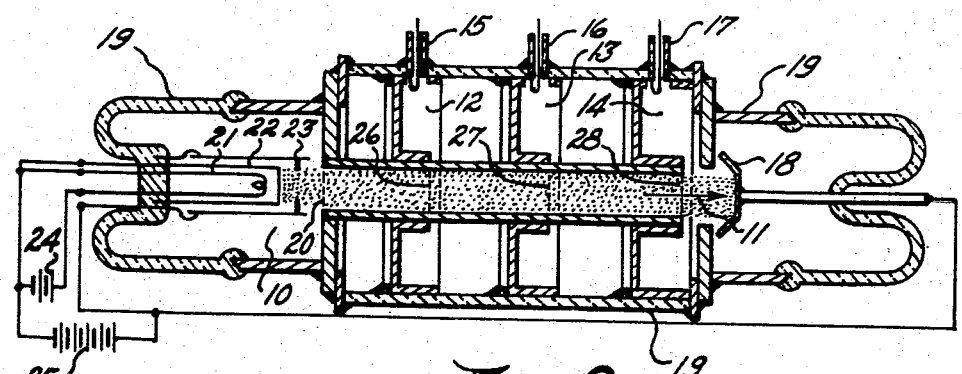
FIG. 2 shows the detailed structure of the preferred embodiment of the present invention.

Now referring to FIG. 2, there is shown the detailed structure of the preferred embodiment illustrated in FIG. 1. There is shown an electron discharge device enclosed by envelope 19. Within envelope 19 there is disposed electron gun 20 which is comprised of filament 21, cathode 22 and electrode 23. Filament 21 is heated by battery 24 and filament 21 and electrode 23 are interconnected by battery 25. Collector 26 is disposed to receive the electrons provided in the form of electron beam 11 by electron gun 20. Collector 26 and electrode 23 are interconnected. A more detailed description illustration, and mode of operation of an electron gun and a beam formed thereby is given at pages 9–15, vol. 7, of Radiation Laboratory Series, published in 1948 by McGraw-Hill Book Company, Inc. It is also possible to utilize within envelope 19 an electron beam source as the Pierce electron gun which is illustrated and described at pages 235–239 of Electronic and Radio Engineering, by Terman, published in 1955 by McGraw-Hill Book Company, Inc.

Also disposed within envelope 19 are three resonant microwave cavities 12, 13 and 14 having coaxial cables 15, 16 and 17, respectively, connected thereto. Each of the coaxial cables has the inner conductor thereof looped inside of its associated cavity to permit the coupling of microwave energy. Cavity resonators 12, 13 and 14 have associated therewith resonator grids 26, 27 and 28, respectively. The cavity resonators may be of the type shown and described at pages 498–502 of vol. 7 of Radiation Laboratory Series, published in 1948 by McGraw-Hill Book Company, Inc.

In the operation of the device illustrated in FIG. 2, electron beam 11 is provided by way of electron gun 10. Beam 11 is directed towards and attracted to collector 18. Cavity 12 receives a microwave input signal by way of coaxial cable 15 and as electron beam passes through of resonator grids 26, it is velocity cavity 12 by way of resonator grids 26, it is velocity modulated proportionally to the microwave input signal. Cavity 13 rectives a microwave reference input signal by way of coaxial cable 16. The reference signal is of the same frequency as the microwave input signal. As electron beam 11 passes through cavity 13 by way of resonator grids 27, it is also velocity modulated thereby. The phase between the reference signal cavity 13 and the input signal to cavity 12 determines the resultant velocity modulation of beam 11. Beam 11 passes through cavity 14 by way of resonator grids 28 and thus interacts with cavity 14. The power delivered to cavity 14 is proportional to the velocity modulation which is a function of the phase between the input and reference signal. Thus the output signal which is available at coaxial cable 17 is proportional to the phase difference. Thus there is provided a simple active device for phase detection at microwave frequencies.

Figure 4:
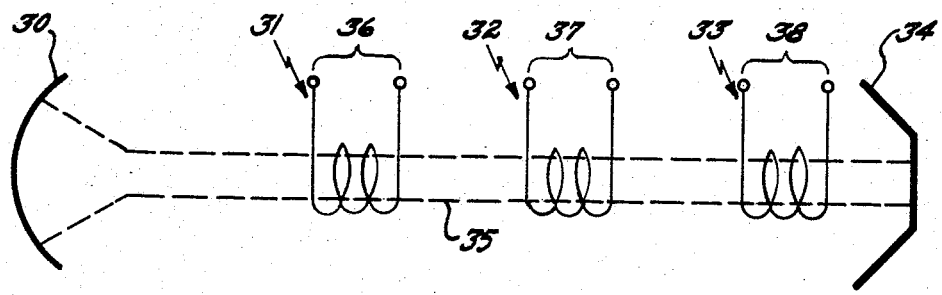
FIG. 4 shows in schematic form another embodiment of my invention.

Now referring to FIG. 4, there is shown a simplified schematic diagram of a traveling-wave tube of my present invention. The mode of operation and structure of a conventional traveling-wave tube is shown and described at pages 678–683 of "Electronic and Radio Engineering," 4th edition, by Terman, published in 1955 by McGraw-Hill Book Company, Inc. However, in place of a single helix section as shown conventionally, there is included in my invention three separated helix sections 31, 32 and 33. The electron beam 35 is provided by electron gun 30 and is directed to collector 34. Phase detection is provided by inserting the phase modulated input signal into helix section 31 by way of terminals 36. A reference input signal is inserted into helix section 32 by way of terminals 37. Helix section 33 provides an output signal by way of terminals 38. It is to be noted that the output signal has an amplitude proportional to the phase difference between the two input signals. One advantage over the cavity phase detector is the bandwidth of the helix. The device operates over a wide band of frequencies.

What is claimed is:

1. A microwave phase detector comprising an electron discharge device including an electron gun providing an electron beam, a collector to receive the electrons in said beam, three resonant cavities interposed between said electron gun and said collector, each of said cavity including resonant grids through which said electron beam passes, the first of said cavities receiving a phase modulated microwave input signal, the second of said cavities receiving a microwave reference signal of the same center frequency as said phase modulated microwave input signal, and the third of said cavities providing an output signal representative of the difference in phase between said microwave input signal and said microwave reference signal.

2. A microwave phase detector electron discharge device comprising electron beam means in said electron discharge device, a first microwave resonant cavity receiving a phase modulated microwave input signal, said electron beam passing through said first cavity and operating to velocity modulate said beam, a second microwave cavity receiving a microwave reference signal of the same center frequency as said phase modulated input signal, said electron beam passing through said second cavity and operating to further velocity modulate said beam, a third microwave cavity, said beam also passing therethrough and interacting therewith to deliver power thereto proportional to the velocity modulation of said beam, output means connected to said third cavity providing an output signal representative of the difference in phase between said phase modulated microwave signal and said microwave reference signal, and collector means to receive the electron in said electron beam upon passing through said three cavities.

3. A microwave phase detector electron discharge device comprising an electron gun to form an electron beam in said electron discharge device, a collector to receive the electrons in said electron beam, three resonant microwave cavities interposed between said electron gun and said collector, the first of said cavities receiving a phase modulated microwave input signal, said electron beam passing therethrough and being velocity modulated in accordance with said microwave input signal, the second of said cavities receiving a microwave reference signal of the same center frequency as said phase modulated input signal, said electron beam passing therethrough and further velocity modulating said electron beam in accordance with said reference signal, and the third of said cavities having output means in the form of a coaxial cable, said electron beam passing through said third cavity and interacting therewith to deliver power thereto that is proportional to the velocity modulation of said electron beam.

4. A microwave phase detector electron discharge device comprising an electron gun to form an electron beam, a first microwave resonant cavity receiving a phase modulated microwave input signal, said first cavity velocity modulating said electron beam proportionally to said microwave input signal, a second microwave resonant cavity receiving a microwave reference signal of the same center frequency as said phase modulated input signal, said second cavity further velocity modulating said beam, the resultant velocity modulation of said beam being determined by the phase between said microwave input signal and said reference signal, and a third microwave cavity having coaxial output means, said electron beam passing therethrough and interacting therewith to provide power thereto proportional to said resultant velocity modulation.

5. A microwave phase detector electron discharge device consisting of an electron gun to form an electron beam, a collector to receive the electrons in said beam, three resonant microwave cavities interposed between said electron gun and said collector, the first of said cavities velocity modulating said beam in accordance with an input phase modulated microwave signal, the second of said cavities further velocity modulating said electron beam in accordance with a microwave reference signal for the same center frequency as said phase modulated input signal to provide a resultant velocity modulation of said electron beam determined by the phase between said input signal and said reference signal, and the third of said cavities having coaxial output means, said electron beam interacting with said third cavity operating to deliver power thereto proportional to said resultant velocity modulation of said electron beam.

6. A microwave phase detector electron discharge device comprising an electron gun to form an electron beam, a collector to receive the electrons in said beam, three helix sections interposed between said electron gun and said collector, the first of said helix sections receiving a phase modulated microwave input signal, the second of said helix sections receiving a reference input signal having the same center frequency as the said phase modulated input signal and the third of said helix sections providing an output signal having an amplitude proportional to the phase difference between said two input signals.

References Cited

UNITED STATES PATENTS

| | | | |
|---|---|---|---|
| 2,767,259 | 10/1956 | Peter | 315—3.6 XR |
| 2,920,228 | 1/1960 | Ginzton | 315—5.41 XR |

OTHER REFERENCES

"Vacuum Tubes," Spangdenberg, McGraw-Hill, New York, 1948; pages 564–566 relied upon.

HERMAN KARL SAALBACH, *Primary Examiner.*

M. NUSSBAUM, *Assistant Examiner.*